US012654331B2

(12) United States Patent
Tulsidas et al.

(10) Patent No.: US 12,654,331 B2
(45) Date of Patent: Jun. 16, 2026

(54) AI-POWERED ROBOTIC WORKSTATION SYSTEM

(71) Applicant: Techolution Consulting LLC, New York, NY (US)

(72) Inventors: Luv Tulsidas, New York, NY (US); Asher Williams, New York, NY (US)

(73) Assignee: Techolution Consulting LLC, New York, NY (US)

( * ) Notice: Subject to any disclaimer, the term of this patent is extended or adjusted under 35 U.S.C. 154(b) by 163 days.

(21) Appl. No.: 18/657,043

(22) Filed: May 7, 2024

(65) Prior Publication Data

US 2025/0345942 A1    Nov. 13, 2025

(51) Int. Cl.
B25J 9/16 (2006.01)
G06T 7/80 (2017.01)

(52) U.S. Cl.
CPC ........... B25J 9/1697 (2013.01); B25J 9/1679 (2013.01); G06T 7/80 (2017.01)

(58) Field of Classification Search
CPC ...... B25J 9/1612; B25J 9/1679; B25J 9/1697; G06T 7/80
See application file for complete search history.

(56) References Cited

U.S. PATENT DOCUMENTS

| | | | | |
|---|---|---|---|---|
| 2021/0122045 A1* | 4/2021 | Handa | ..................... | B25J 13/084 |
| 2023/0226690 A1* | 7/2023 | Chen | ....................... | H04L 67/12 |
| | | | | 700/112 |
| 2025/0245994 A1* | 7/2025 | Daue | ................ | G06V 30/19147 |
| 2025/0312913 A1* | 10/2025 | Ponnappan | ............ | B25J 9/1615 |

* cited by examiner

*Primary Examiner* — Wade Miles
*Assistant Examiner* — Jerrod Irvin Davis
(74) *Attorney, Agent, or Firm* — Mestechkin Law Group P.C.

(57) ABSTRACT

An autonomous and adaptable AI-powered robotic workstation system is designed for diverse real-world applications. This includes a configurable workstation seamlessly integrating a dynamic robotic hand, endowed with real-time decision-making capabilities. The workstation features an automatic calibration and self-configuration mechanism utilizing six-axis motion for task execution, ensuring alignment and auto-positioning via cameras. A dynamic and no-code onboarding process with auto-calibration captures and stores product onboarding, optimization of object categorization and prioritizing captures using vision AI. The system also includes a vision-based operations module with AI-driven functionality, integrated hardware, scalable design, calibration capabilities, and unification of specified operations within the same workstation system.

18 Claims, 4 Drawing Sheets

AI-POWERED ROBOTIC WORKSTATION SYSTEM

FIELD OF THE INVENTION

The present application relates to the field of robotics, artificial intelligence (AI), and computer vision technology. Specifically, it pertains to an advanced robotic system that combines an AI-driven workstation with an integrated robotic hand, offering unparalleled versatility and adaptability across various tasks including but not limited to product counting, sorting, placement, and high precision quality control inspections.

BACKGROUND OF THE INVENTION

The field of robotics has ushered in a transformative era of automation, empowering machines with precision, efficiency, and autonomous capabilities. The integration of AI and robotics has particularly advanced in applications like product handling and packaging systems, marking significant strides in industrial automation. Despite this progress, a critical gap persists in the holistic integration of AI-driven components, especially robotic hands, with adaptive workstations. This gap serves as the impetus for transformative innovation, given that existing systems tend to be narrowly focused on specialized applications, such as product handling.

These challenges encompass several issues including but not limited to intricate integration issues, operational inefficiencies, and a notable deficiency in adapting to the complexities of dynamic industrial environments. The present state of industrial automation reveals a conspicuous gap in achieving seamless and responsive integration between AI-driven components and the workstations that serve as their operational hubs. Moreover, prior art worsens this gap by predominantly concentrating on product handling and packaging systems, sidelining the integration of AI hands with workstations. Consequently, this landscape struggles with integration limitations, operational inefficiencies, and adaptability constraints.

Operational challenges are further magnified by the manual calibration processes in existing systems, introducing bottlenecks and restricting overall system responsiveness. The pressing need for a solution that not only automates calibration processes but dynamically adapts to evolving task requirements becomes evident. This lack of adaptability not only hampers operational efficiency but also limits the widespread adoption of these systems in industries characterized by varying scales and operational complexities. The drawbacks of existing systems in industrial automation are multifaceted, posing significant challenges to their efficacy in dynamic settings. Firstly, there is a notable lack of versatility in the current literature, limiting adaptability to the diverse demands of industrial or commercial environments. Scalability becomes a concern as some prior art struggles to expand seamlessly with increasing task volumes or diverse applications, hindering widespread adoption in industries with varying operational scales and complexities.

Moreover, many existing systems fall short in autonomous adaptation, lacking the capability to adjust to changing task requirements or environmental conditions, resulting in solutions that are less responsive and adaptable. Another critical drawback lies in the integration gap prevalent in current solutions. The emphasis on product handling often overshadows the potential synergy between AI hands and workstations, limiting the overall efficiency and scope of these systems. Lastly, the absence of an Auto Calibration and Onboarding feature in conventional setups introduces challenges, as manual intervention is required for these crucial processes, impacting overall efficiency.

Overall, these drawbacks underscore the urgent need for a comprehensive and adaptable solution. The AI-powered robotic workstation system seamlessly amalgamates a robotic hand with a configurable setting, not only redressing the deficiencies of existing systems but also charting a pioneering course for the future of AI, computer vision, and robotics integration. The described invention addresses these drawbacks comprehensively, offering a solution that not only mitigates these limitations but also introduces pioneering features such as Auto Calibration and Onboarding to enhance efficiency in industrial automation.

SUMMARY OF THE INVENTION

The present invention relates to a system that includes a configurable workstation seamlessly integrated with a robotic hand, featuring dynamic adaptability for various tasks such as pick-and-place, high-quality inspection, and sorting of components.

In an embodiment of the present invention, AI-powered robotic workstation system includes a configurable workstation seamlessly integrated with a robotic hand capable of executing various tasks. An exemplary set of tasks includes: an automatic calibration and self-mechanism that utilizes six-axis motion for efficient task execution; ensuring optimal alignment and auto-positioning through external cameras; a dynamic onboarding process with an auto-calibration mechanism for capturing and storing new product information; optimizing object categorization and a vision-based operations module.

In another embodiment of the present invention, the system includes vision-based operations module associated within the workstation system, wherein the module consists of AI-driven functionality for product counting, material handling, quality control inspections, scanning, product inventory counting, and high-precision component inspection, integrated hardware for seamless performance within the workstation system.

In one embodiment, a robotic workstation system includes a configurable workstation. The workstation further includes a robotic hand integrated into the workstation system, wherein said robotic hand is configured to dynamically accommodate diverse directions, angles, and orientations in real-time. The robotic hand may be configured for executing various tasks including at least one of pick-and-place objects, quality inspection, and counting and sorting of the objects.

In one embodiment, the workstation system may be integrated with an automatic calibration and self-configuration mechanism, wherein the automatic calibration and self-configuration mechanism uses six-axis motion to carry out task requirements. Six-axis motion may permit allows the workstation to align itself with products and further through an auto-positioning feature via a camera able to attain a view of the product to capture information required for the tasks. The robotic arm may include a calibration mechanism which adapts itself to task requirements and ensures self-adjustment by auto-adjusting focus and lighting conditions thereby capturing a best quality image of the product through the calibration process. The system may further include a dynamic onboarding process with an auto-calibration mechanism that captures and stores new product information in a database for optimized object categorization and ensures adaptability to diverse product specifications.

In one embodiment, the system includes a vision-based operations module 205 associated within the workstation system, wherein the module includes AI-driven functionality for product counting, material handling, quality control inspections, scanning, product inventory counting, and high-precision component inspection.

In one embodiment, the workstation includes an interactive touchscreen monitor that serves as a user interface for controlling the robotic hand's activities, adjusting workstation settings, and monitoring overall system performance. The interface may further include a speaker, microphone, display with touchscreen and keyboard, providing users with a means for at least one of text, audio, video, and touch to interact, observe system operations, and visualize functions. The system may further include a plurality of external cameras positioned around the workstation and further utilizes camera data for tracking coordinates of the product and AI-based 3D path planning for the robotic hand. External cameras may collectively establish a comprehensive field of view, enabling complete coverage of the workstation.

In one embodiment, the camera functions as a safety monitoring system having knowledge about its surroundings and environments, enhancing the overall safety features of the system. The system may further include adjustable legs, wherein the adjustable height legs within the workstation for ergonomic positioning for diverse tasks.

In one embodiment, the workstation assists in training or retraining the AI model in a no code manner through a one-click intuitive user experience or a conversational AI. The system may operate on edge high computing devices with integrated robotics in the electronics and is connected to the cloud platform to provide robust support for on-edge functioning and enhance the capabilities of the workstation system. AI workstation may be equipped with wheels for mobility to efficiently handle an array of tasks including the opening of compartments of products, retrieving items, conducting scans, and processing each item with efficiency. AI workstation 201 may be integrated with a barcode printer to generate QR codes for several items, ensuring a seamless workflow.

In one embodiment, the system enables real-time notifications through categorization processes, facilitating prompt defect identification or product quality verification, ensuring heightened quality control, and allowing seamless workflow guidance based on precise categorization outcomes. The system may further include an autonomous inventory management system that collects items from diverse conveyor belts (incoming and processed items) with precision and further picks them and stacks these items on each side of the workstation, thereby eliminating the necessity for human intervention in the entire process. The system may be further configured to stack items on each side of the workstation, followed by a triage process that precisely categorizes the items as either pass or fail. In one embodiment, when workstation encounters challenges in categorizing an item as pass or fail, it autonomously triggers human intervention for assistance.

It should be noted that while the present invention has been described with reference to fasteners, it is not limited to this particular type of manufactured object and can be adapted to inspect other types of objects as well. Additionally, various modifications and alterations to the system and method may be possible without departing from the scope of the invention.

BRIEF DESCRIPTION OF THE DRAWINGS

The foregoing summary, as well as the following detailed description of various embodiments, is better understood when read in conjunction with the drawings provided herein. For the purposes of illustration, the drawings disclose subject matter which is not limited to the specific methods and instrumentalities disclosed. Further, the advantages and features of the present disclosure will be better understood with reference to the following detailed description and claims taken in conjunction with the accompanying drawing, wherein like elements are identified with like symbols, and in which:

DETAILED DESCRIPTION OF THE INVENTION

The following description includes the preferred best mode of one embodiment of the present invention. It will be clear from this description of the invention that the invention is not limited to these illustrated embodiments but that the invention also includes a variety of modifications and embodiments thereto. Therefore, the present description should be seen as illustrative and not limiting. While the disclosed embodiments are susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In any embodiment described herein, the open-ended terms "comprising," "comprises," and the like (which are synonymous with "including," "having" and "characterized by") may be replaced by the respective partially closed phrases "consisting essentially of," consists essentially of," and the like or the respective closed phrases "consisting of," "consists of, the like. As used herein, the singular forms "a," "an," and "the" designate both the singular and the plural, unless expressly stated to designate the singular only. Further, the use of terms "first", "second", and "third", and the like, herein do not denote any order, quantity, or importance, but rather are used to distinguish one element from another.

The present application generally provides a system that includes a configurable workstation integrated with a robotic hand, featuring dynamic adaptability for various tasks, such as pick-and-place, high-quality inspection, and sorting of components.

Figure 1:
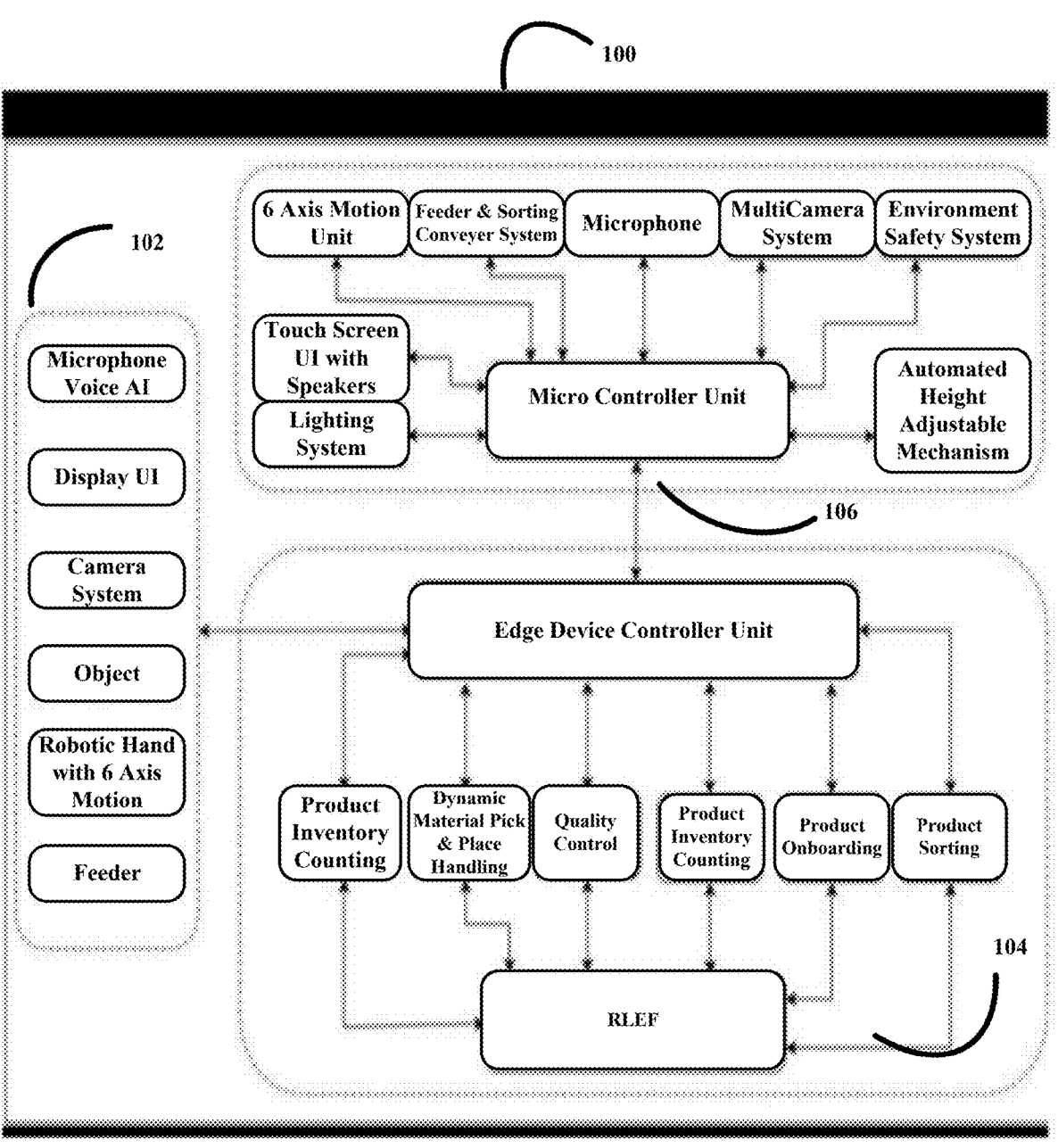
FIG. 1 illustrates an exemplary architectural flow diagram of a workstation system.

FIG. 1 illustrates an architectural flow diagram of the device divided into three sections namely input (interface) 102, output 104, and processing unit 106. In one embodiment, the three sections may be functionally interconnected to each other, as discussed herein.

Input (Interface) Section—The input section 102 serves as a critical interface for human interaction with the system. The section encompasses various components, including the voice AI module, touch screen display user interface, camera system, robotic hand, and other sensory inputs such as temperature and smoke sensors. These components are designed to capture diverse types of data essential for the system's operation and decision-making processes.

For example, the voice AI module enables users to interact with the system using spoken commands, while the touch screen display user provides live feedback system for the users directly from the system through voice, text and real-time correction-based feedback. Microphone or voice artificial intelligence refers to enables machines to understand, interpret, and respond to human speech. It encompasses a variety of techniques and algorithms designed to process spoken language and extract meaningful information from it.

The multi-functionality of the robotic hand, which serves as both an input device and a means of interaction with physical objects in the system's environment. The robotic hand is equipped with various sensors and actuators that enable it to perform tasks such as grasping objects, real time navigation, and decision making in response to dynamic environmental changes, and responding to user commands. Robotic hand sensors may include joint encoders, force/torque sensors, proximity sensors, vision sensors, infrared sensors, accelerometers and gyroscopes, temperature sensors, load cells and contact sensors. Joint encoders measure the angles or positions of the robotic arm's joints. They provide feedback to a control system, allowing precise control of the arm's movements. Force and torque sensors measure the forces and torques applied to the robotic arm's end effector (the tool or gripper at the end of the arm). Force and torque sensors enable the arm to sense contact with objects and adjust its movements accordingly, allowing for tasks that require delicate handling or force control. Proximity sensors detect the presence or absence of objects in the arm's vicinity without physical contact. Proximity sensors can be used for object detection, collision avoidance, or to trigger specific actions based on proximity. Vision systems, including cameras and depth sensors (such as LiDAR or depth cameras), provide visual feedback to the robotic arm. Vision systems enable tasks such as object recognition, localization, tracking, and navigation in complex environments. Infrared sensors also enable tasks such as object detection and collision avoidance. Temperature sensors monitor the temperature of the robotic arm's components to prevent overheating and ensure safe operation. Load cells measure the weight or force applied to the robotic arm's end effector or along its structure. Load cells may be utilized for tasks that require precise force control or weight measurement. Contact sensors detect physical contact between the robotic arm and objects in its environment. Contact sensors may be utilized for tasks that require precise positioning or feedback upon contact.

These sensors may provide environmental data for the system's operation and safety. The input section serves as the gateway through which users interact with the system and provides input data essential for its functioning. By integrating a diverse range of input devices and sensors, the system can capture and process relevant data effectively, enabling seamless human-system interaction and enhancing the overall autonomous operation.

The output section 104 is functionally connected to the input section and the processing unit to exchange instructions and data between them. In one embodiment, the output section 104 receives information from the processing unit 106 as discussed below.

The processing unit section 106 may include the microcontroller unit which in turn is directly associated with the edge device controller unit. A microcontroller is a small, self-contained computer-on-a-chip designed to control a specific function within an embedded system. It includes a central processing unit (CPU), memory (both volatile RAM and non-volatile ROM or flash memory), input/output (I/O) ports, and various peripherals, all integrated onto a single integrated circuit (IC) or chip.

The edge processing unit serves as the core component responsible for executing tasks, processing data, and controlling various operations. In one embodiment, the edge processing unit and the microcontroller unit include or are in communication with the microphone and/or microphone AI, the 6 Axis motion unit, the feeder and sorting conveyor system, the touch screen user interface, the lighting system, the multi-camera system, the environment safety system, the automated height adjustable mechanism.

The microphone component captures audio input, enabling the system to process voice commands or interact with users through speech recognition.

The multi-camera system may include multiple cameras strategically positioned to capture visual data of products from different perspectives. These cameras provide high-resolution images and videos, allowing the system to analyze and interpret visual information accurately. The multi-camera setup enables tasks such as object recognition, motion tracking, and depth sensing.

The environmental safety system monitors environmental conditions such as temperature, humidity, air quality, and presence of smoke or hazardous gases. It ensures the safety and well-being of users by detecting potential hazards or anomalies in the surrounding environment in the proximity of the AI Hand module. The environmental safety system may include sensors, detectors, and alarms to alert users and take appropriate actions in case of emergencies.

The lighting system controls the illumination within the system's workspace, ensuring optimal visibility for cameras and sensors. It automatically adjusts with respect to AI and sensor inputs, the brightness, color temperature, and direction of light sources to achieve consistent and uniform lighting conditions.

The touch screen interface provides a graphical user interface (GUI) for users to interact with the system. It includes a display screen for presenting visual feedback, touch-sensitive controls for input, and integrated speakers for audio output.

The touch screen specifications can vary depending on the specific application and intended use of the touch screen. The touch screen interface enables intuitive and user-friendly interaction, allowing users to configure settings, view status updates, and receive audiovisual feedback from the system.

The six axes Motion Unit enables precise control of movement and positioning within the system's workspace. It consists of six degrees of freedom, allowing translational and rotational motion along multiple axes. Six-axis motion typically refers to the capability of a system to move or detect movement along six different axes. In a coordinate system, these axes are typically defined as X, Y, and Z for linear movement (forward/backward, left/right, up/down), and then three rotational axes, typically referred to as roll, pitch, and yaw. The six degrees include 1) X-axis. This is typically the horizontal axis, representing left and right movement 2) Y-axis, also typically horizontal, representing forward and backward movement 3) Z-axis, the vertical axis, representing up and down movement 4) Roll, Rotation around the X-axis, akin to tilting side to side 5) Pitch, Rotation around the Y-axis, similar to nodding up and down and 6) Yaw, Rotation around the Z-axis, akin to turning left and right. These six axes of motion allow for complex movements and orientations in three-dimensional space, crucial for tasks like precision manufacturing, robotic assembly, and advanced control. The six-axis motion unit facilitates tasks such as object manipulation, pick-and-place operations, and robotic control with high accuracy and flexibility.

The feeder and sorting conveyor system automates the transportation and handling of objects within the system's workflow. It includes mechanisms for loading, conveying, sorting, and unloading objects based on predefined criteria.

The automated height adjustable mechanism enables dynamic adjustment of the system's working height to accommodate different users or task requirements. It provides flexibility and ergonomics for users interacting with the system, allowing them to customize the workstation according to their preferences.

Figure 2:
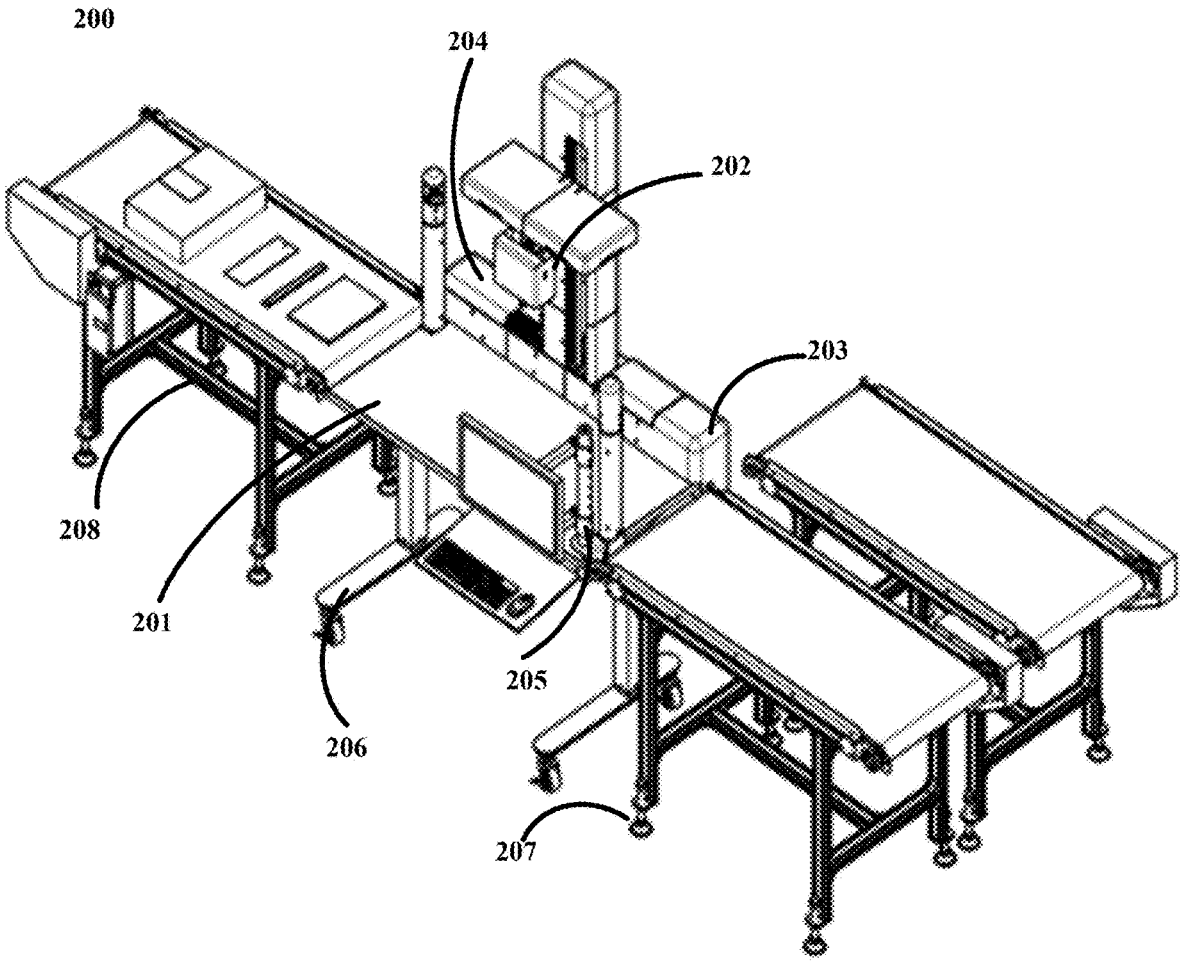
FIG. 2 illustrates a perspective view of an exemplary workstation system.

Referring to FIG. 2, the AI-powered robotic workstation system 200 includes a configurable workstation 201 integrated with an adaptable robotic hand 202, which is configured for executing various tasks. The system 200 preferably also includes an automatic calibration and self-configuration mechanism 203 that utilizes data relating to six-axis of motion for efficient task execution, ensuring optimal alignment and auto-positioning through the use of external cameras 204. The system may also include a dynamic onboarding process with an auto-calibration mechanism 203 for capturing and storing new product information, optimizing object categorization/classification and a vision-based operations module 205 as illustrated in FIG. 1.

The robotic hand 202 is integrated into the workstation 201 and features dynamic adaptability to accommodate diverse directions, angles, and orientations and is equipped with real-time decision-making capabilities. The robotic hand 202 mimics human dexterity and motion, with six degrees of freedom, enabling versatile manipulation. The operation of the robotic hand 202 may utilize servo and stepper motors, ensuring precise control over its movements for task execution and real time path navigation and object handling.

Further, the robotic hand 202 is capable of executing various tasks including but not limited to pick-and-place of small and delicate components, high-quality inspection, and the sorting of components.

The automatic calibration and self-configuration mechanism 203 is integrated into the workstation system 201 and the six-axis motion within it allows the workstation to properly align itself with the products. The auto-positioning feature via camera 204 is able to attain the optimal view of the image(s) including focus, field of view and zooming in to the required area to capture the required images and information from various types of products.

The system's 200 auto-positioning and image capture begins by assessing the field of view to ensure that the product is properly positioned within the camera's sight. This initial step is crucial for capturing several images without missing any details. Once the product is detected within the field of view, the system 200 automatically adjusts the camera's focus to ensure that the captured images are sharp and clear. This auto-focusing mechanism enhances the overall image quality and ensures that important details are captured accurately.

Moreover, the system 200 dynamically adjusts the lighting conditions to optimize image quality before capturing the images. This includes adjusting the brightness, color temperature, and other parameters to ensure that the product is well-lit and visible in the captured images.

The calibration mechanism 203 adapts itself to task requirements and ensures self-adjustment for optimal performance by auto-adjusting the focus and the lighting conditions thereby capturing the quality image of the product through the calibration process.

Furthermore, the dynamic onboarding process with an auto-calibration mechanism 203 captures and stores new product information in the database for optimized object categorization and ensures adaptability to diverse product specifications, prioritizing the highest quality capture during onboarding using advanced vision AI.

Moreover, the system's 200 auto-positioning feature further complements the onboarding process by capturing optimal and diverse images of newly introduced products from various angles. These images are seamlessly integrated into the system's AI, facilitating efficient onboarding within the database. Through this autonomous workflow, manual intervention is eliminated, streamlining the integration process and enhancing operational efficiency.

The system 200 further includes vision-based operations module 205 associated within the workstation system, wherein the module 205 consists of AI-driven functionality for product counting, material handling, quality control inspections, scanning, product inventory counting, and high-precision component inspection.

Additional features augment the system's capabilities, including an interactive touchscreen monitor 206 serving as a user interface for control over the robotic hand's 202 activities, adjustments to workstation settings, and monitoring overall system performance.

This interface 206 is further enriched with components such as a speaker, microphone, display with touchscreen and keyboard, enabling users to interact through text, audio, video, and touch, significantly enhancing the overall user experience.

The system incorporates a strategic placement of a plurality of external cameras 204 around the workstation. These cameras 204 collectively establish a comprehensive field of view, enabling complete coverage of the workstation. Beyond tracking coordinates, cameras 204 function as a safety monitoring system, providing complete awareness of the system's surroundings and environments, thereby enhancing overall safety features.

The safety monitoring system serves to ensure safe operation by continuously scanning the environment using sensors cameras and proximity sensors. It detects potential hazards, including the presence of humans, and employs collision avoidance algorithms to prevent accidents. The system dynamically adjusts its operations in response to detected hazards, potentially slowing down or halting operations as necessary. Integration with AI model enhances the effectiveness of safety monitoring by analyzing real-time sensor data and making informed decisions. The feature also includes human-system interaction elements such as warning signals and visual feedback.

Adjustable height legs 207 within the workstation 201 offer ergonomic positioning for diverse tasks, while the loading area is customizable to accommodate varied objects efficiently.

The AI workstation 201 is equipped with wheels 208 for mobility to efficiently handle an array of tasks including the opening of compartments of products, retrieving items, conducting scans, and processing each item with efficiency.

The workstation 201 further includes a barcode printer to generate QR codes for several items, ensuring a seamless workflow.

Furthermore, the workstation 201 assists in training or retraining the AI model in no code manner through a one-click intuitive user experience or a conversational AI. No code artificial intelligence training refers to the process of creating and training artificial intelligence models without writing any code.

In one embodiment, a no code platform may present an intuitive user interface that allows users to interact with the configurable workstation and robotic hand.

In one embodiment, a user may interact with the user interface to upload their data directly to the platform or connect to external data sources such as databases or cloud storage. The no code platform may offer built-in tools for data cleaning, preprocessing, and feature engineering, allowing users to prepare their data for machine learning.

In one embodiment, the no code platform may offer a selection of pre-built machine learning models or templates for common use cases such as classification, regression, or clustering. Users can choose the model that best fits their needs and customize it using configurable options or parameters.

In one embodiment, through a one-click intuitive user experience or a conversational AI, the experts can provide corrections/feedback to the apprentice level AI system. The interface 206 is easy to navigate and understand via the one click intuitive user experience, even for non-technical experts. The AI system engages in natural language conversations with the human expert, allowing them to provide feedback and corrections in a conversational manner. This conversational AI could be similar to interacting with a virtual assistant, where the expert can type or speak their inputs.

An integrated feeding mechanism within the loading area facilitates object grouping and autonomous transfer to an integrated sorting mechanism upon task completion, streamlining overall workflow processes.

The system 200 operates on edge high computing devices with integrated robotics in the electronics, establishing a robust connection to the cloud platform. This connectivity provides substantial support for on-edge functioning and augments the overall capabilities of the workstation system.

The system 200 integrates an advanced autonomous inventory management system 209 with a workstation 201. This innovative setup efficiently retrieves items from diverse conveyor belts, precisely arranges them on either side of the workstation 201, and conducts an item sorting process to determine pass or fail status. In cases where the system encounters challenges in accurately categorizing items, it autonomously triggers human intervention for resolution. This sophisticated automation minimizes the need for manual intervention, ensuring streamlined operations while maintaining high levels of accuracy and efficiency in item handling and categorization.

In executing end-to-end autonomous processes, the workstation system 200 includes efficiently executing procedures encompassing picking, sorting, inspecting, and placing products. Real-time notifications generated through categorization processes further contribute to heightened quality control by facilitating prompt defect identification or product quality verification. This ensures seamless workflow guidance based on precise categorization outcomes.

Figure 3:
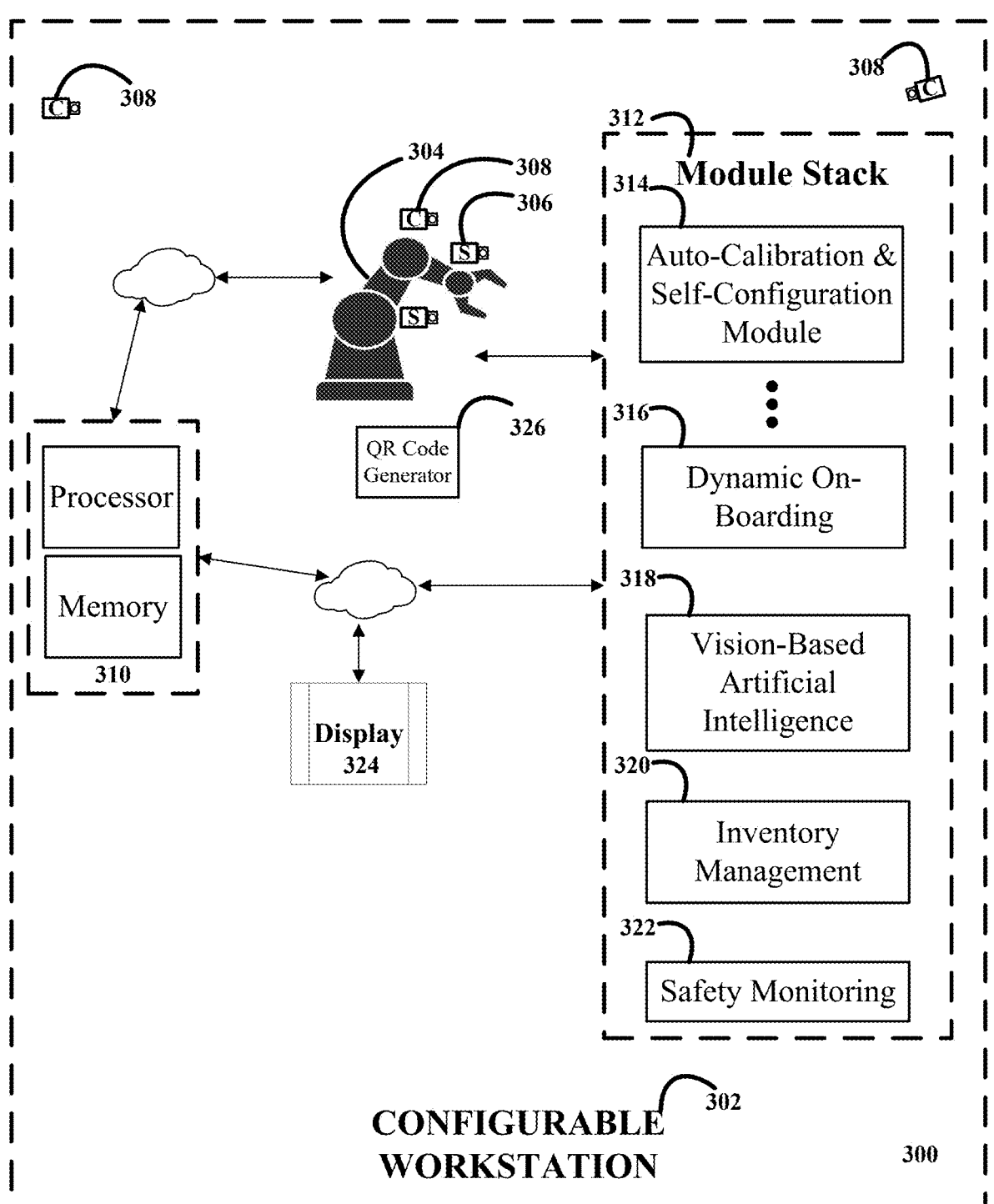
FIG. 3 illustrates an exemplary architecture of the configurable workstation.

FIG. 3 illustrates a robotic workstation system 300 according to one embodiment. The robotic workstation system includes a configurable workstation 302, a robotic hand 304 integrated into the configurable workstation. The robotic hand 304 is configured to operate with a six-axis motion providing dynamic accommodation of diverse directional and diverse angular orientations. The robotic hand 304 includes one or more sensors 306 integrated with the robotic hand. According to one embodiment, one or more sensors may transmit input sensory data to the robotic hand and the configurable workstation. The configurable workstation may include a camera 308 associated with the workstation capturing one or more environmental images and one or more product images.

The camera may be equipped with artificial intelligence. For example, the camera itself may be configured to conduct object recognition and detection. This includes recognizing specific objects, such as products, but is not limited to products. For example, according to one embodiment the camera may be able to detect a person and authenticate that individual for interaction with the robotic hand. This may be accomplished via facial recognition. The camera may be further equipped to conduct gesture recognition. For example, the camera may be trained to recognize and interpret human gestures. This allows users to interact with the robotic hand using gestures rather than physical controls. The camera may be further equipped to conduct real-time analysis by performing image analysis and processing in real-time. This permits the configurable workstation to provide immediate feedback and response to detected events or situations. In one embodiment, the camera may be equipped with edge computing capabilities, where AI algorithms are executed directly on the camera hardware rather than relying on external servers or cloud computing. This enables faster processing and reduces the need for constant internet connectivity.

The workstation may be in communication with a processor and memory in communication with the workstation. In one embodiment, the processor and memory are configured to receive the input sensory data, the one or more environmental images and product images. The processor also may be configured to provide instructions to the robotic hand to execute tasks including pick- and place, quality inspection, counting and sorting. Although the processor may provide instructions to perform other tasks, the above noted are exemplary and should not be understood to limit the functionality of the robotic hand.

As shown in FIG. 3, the configurable workstation may include a module stack 312. The module stack may include a variety of modules. For example, the module stack 312 depicted in FIG. 3 includes an auto-calibration and self-configuration module 314, a dynamic on-boarding module 316 and a vision-based artificial intelligence 318. In one embodiment, the automatic calibration and self-configuration module is installed in the memory and may be defined by one or more task requirements. In one instance, the task requirement of the automatic and self-configuration module may include adjustments to one or more camera settings to capture environmental images and product images. The module stack further includes a dynamic onboarding module installed in the memory storing product information received from one or more sensors.

As illustrated, the module stack may also include a vision-based artificial intelligence module installed in the memory. In one embodiment, the vision based artificial intelligence is configured to perform tasks including product counting, material handling, quality control inspection. In one embodiment, the configurable workstation may include an inventory management module 320 configured to receive information from the configurable workstation regarding one or more incoming products and one or more processed products. The inventory management module may be configured to provide instructions to the robotic hand to select and stack the processed products according to predefined settings.

The robotic workstation system may include a display 324 presenting an interactive touchscreen user interface configured to provide controls for the robotic hand, settings for the workstation and workstation performance settings. The workstation system may further include a speaker providing output from the configurable workstation and a microphone receiving input from one or more users. In one embodiment, the camera 308 includes a plurality of cameras positioned around the configurable workstation, at least one of the cameras includes software instructions defining a product tracking module and wherein the robotic hand includes an artificial intelligence based three-dimensional predictive path module. These software instructions may reside on board the camera or in networked memory associated with the configurable workstation.

In one embodiment, the display presents a comprehensive field of view derived from the plurality of cameras positioned around the configurable workstation. The robotic workstation may include within the module stack a safety monitoring module 322 receiving the input sensory data, one or more environmental images and the product images. In one embodiment, the safety monitoring module may establish a safety baseline including a collision detection threshold, a force limiting threshold and an emergency stop threshold. The configurable workstation may include an artificial intelligence training module configured to train the configurable workstation. In one embodiment, the module includes a training interface, a data connection and processing platform, a machine learning model selector, a training module and a deployment module. The workstation 302 may include one or more adjustable legs providing ergonomic support to the configurable workstation. In one embodiment, the workstation 302 may include a QR code generator 326 integrated into the configurable workstation. The configurable workstation may be configured to transmit real-time notifications from a product classifier engine.

Figure 4:
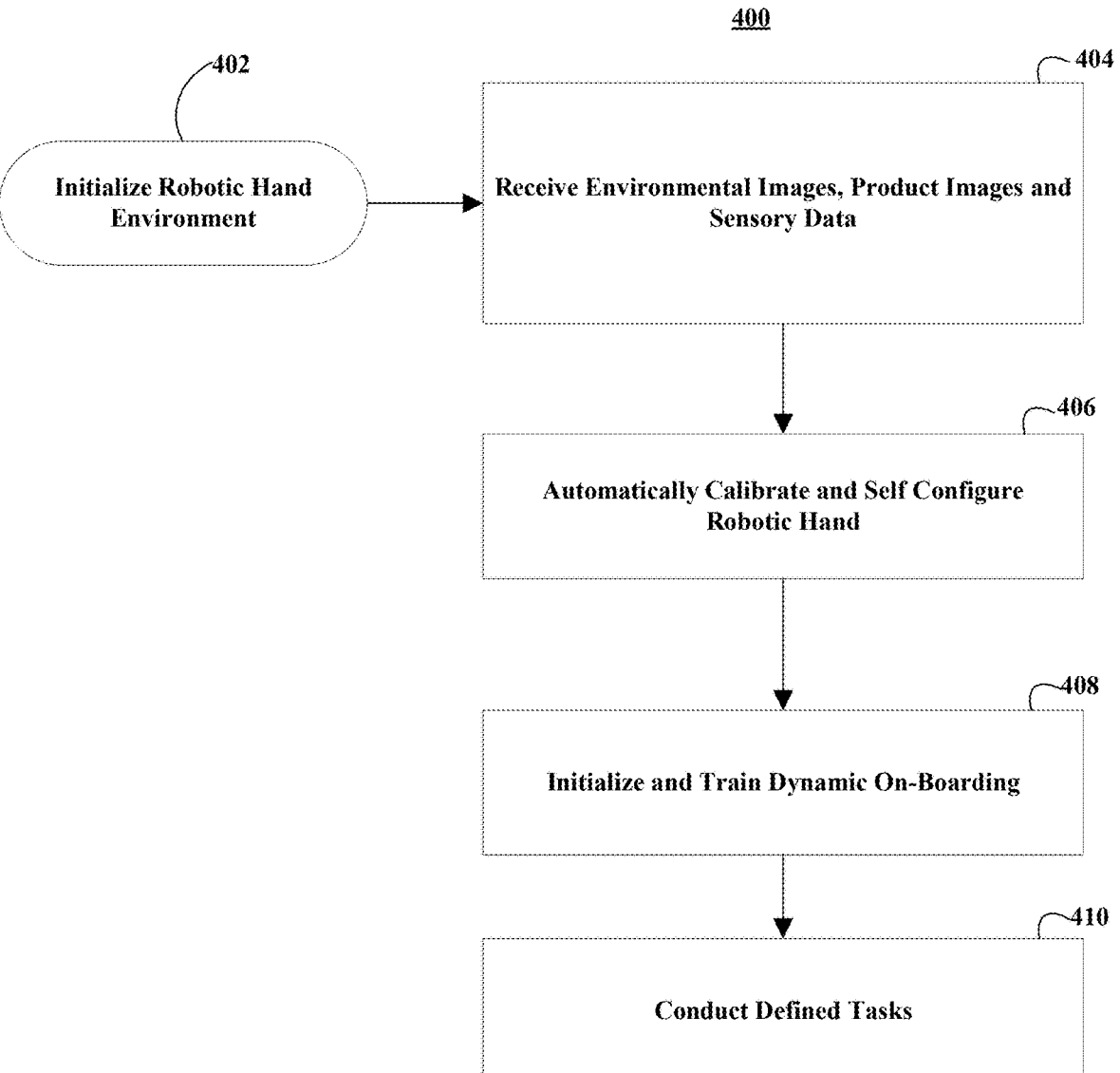
FIG. 4 illustrates one embodiment of a flow diagram for the AI powered workstation system.

FIG. 4 illustrates a flow diagram 400 at least one process according to one embodiment. The flow diagram includes initializing the robotic hand 402. As illustrated, the flow diagram also includes receiving environmental images, product images and sensory data 404. The configurable workstation may also perform the step of automatically calibrating and self-configuring the robotic hand 406. In one embodiment, the configurable workstation may perform the step of initializing and training dynamic on-boarding 408. FIG. 4 further illustrates the step of conducting defined tasks 410.

The step of automatically calibrating and self-configuring 406 may be accomplished in a variety of ways. Self-calibration in robotic hands involves the process by which the hand autonomously adjusts its position, orientation, or internal parameters to ensure accurate and precise operation without human intervention. This may be accomplished, at least in part, with sensor feedback. In one embodiment, the robotic hand may equipped with sensors such as encoders, force sensors, and tactile sensors to measure joint angles, forces exerted on the hand, and tactile feedback from interactions with objects. By comparing sensor readings to expected values or reference data, the hand can detect deviations and adjust its parameters accordingly to achieve desired performance. In one embodiment, the robotic hand may utilize a closed loop control circuit. A closed-loop control circuit may continuously monitor the robotic hand's output and adjust input signals to maintain desired performance. Self-calibration algorithms use feedback from sensors to iteratively adjust control parameters such as joint angles, stiffness, and damping coefficients until the hand's behavior matches the desired reference model. In one embodiment, the robotic hand may include kinematic calibration. For example, a robotic hand with multiple joints and degrees of freedom may require kinematic calibration to ensure accurate positioning and movement. Self-calibration algorithms can analyze sensor data to estimate and correct errors in joint angles, link lengths, and other kinematic parameters, optimizing the hand's kinematic model for accurate motion control. In one embodiment, the robotic hand may include force/torque calibration. Like kinematic calibration, feedback signals from sensors allow the robotic hand to compensate for mechanical imperfections and environmental factors, ensuring consistent and reliable performance in object handling tasks.

The step of dynamic onboarding for new products for classification involves collecting data, e.g., images of product, bar codes, and text recognition, etc. The collected data may then be processed for feature extraction using machine learning techniques. In one embodiment, a model may be trained on previously obtained or labeled data, supervised learning or the model may discover patterns in the extracted features without explicit labels, unsupervised learning. As new products are introduced, the model may be dynamically updated with the labels affixed by the supervised and/or unsupervised learning technique.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus, the scope of the present disclosure is defined by the appended claims and includes both combinations and sub combinations of the various features described herein above as well as variations and modifications thereof, which would occur to persons skilled in the art upon reading the foregoing description.

The invention claimed is:

1. A robotic workstation system, comprising:
   a configurable workstation;
   a robotic hand integrated into the configurable workstation; the robotic hand configured to operate with a six-axis motion providing dynamic accommodation of diverse directional and diverse angular orientations;
   one or more sensors integrated with the robotic hand, the one or more sensors transmitting input sensory data to the robotic hand and the configurable workstation;
   a camera associated with the workstation capturing one or more environmental images and one or more product images;
   a processor and memory in communication with the workstation, the processor and memory configured to receive the input sensory data, the one or more environmental images and product images;
   an automatic calibration and self-configuration module installed in the memory, the automatic calibration and self-configuration module being defined by one or more task requirements; wherein the automatic and self-configuration module adjusts one or more camera settings to capture the one or more environmental images and one or more product images;

a dynamic onboarding module installed in the memory storing product information received from the one or more sensors;

a vision-based artificial intelligence module installed in the memory configured to perform tasks including product counting, material handling, quality control inspection; and wherein the processor is configured to provide instructions to the robotic hand to execute tasks including pick- and place, quality inspection, counting and sorting; and a display presenting an interactive touchscreen user interface configured to provide controls for the robotic hand and settings for the workstation, and wherein the camera includes a plurality of cameras positioned around the configurable workstation, at least one of the cameras including a product tracking module and wherein the robotic hand includes an artificial intelligence based three-dimensional predictive path module.

2. The robotic workstation system of claim 1, comprising: a speaker providing output from the configurable workstation; and a microphone receiving input from one or more users.

3. The robotic workstation of claim 1, wherein the display presents a comprehensive field of view derived from the plurality of cameras positioned around the configurable workstation.

4. The robotic workstation of claim 1, comprising: a safety monitoring module receiving the input sensory data, the one or more environmental images and the product images, the safety monitoring module establishing a safety baseline including a collision detection threshold, a force limiting threshold and an emergency stop threshold.

5. The robotic workstation of claim 1, comprising: one or more adjustable legs providing ergonomic support to the configurable workstation.

6. The robotic workstation of claim 1, comprising: an artificial intelligence training module configured to train the configurable workstation, the module including a training interface, a data connection and processing platform, a machine learning model selector, a training module, and a deployment module.

7. The robotic workstation of claim 1, comprising: QR code generator integrated into the configurable workstation.

8. The robotic workstation of claim 1, wherein the configurable workstation transmits real-time notifications from a product classifier engine.

9. The robotic workstation of claim 1, comprising: an inventory management module configured to receive information from the configurable workstation regarding one or more incoming products and one or more processed products, the inventory management module further configured to provide instructions to the robotic hand select and stack the processed products according to predefined settings.

10. A robotic workstation system, comprising:

a configurable workstation;

a robotic hand integrated into the configurable workstation; the robotic hand configured to operate with a six-axis motion providing dynamic accommodation of diverse directional and diverse angular orientations; wherein the robotic hand includes an artificial intelligence based three-dimensional predictive path module, wherein the three-dimensional predictive path module predicts a trajectory for the robotic hand to pick up the objects, and wherein the three-dimensional predictive path module utilizes computer vision algorithms and sensor data to predict the trajectory;

one or more sensors integrated with the robotic hand, the one or more sensors transmitting input sensory data to the robotic hand and the configurable workstation;

a camera associated with the workstation capturing one or more environmental images and one or more product images;

a processor and memory in communication with the workstation, the processor and memory configured to receive the input sensory data, the one or more environmental images and product images;

an automatic calibration and self-configuration module installed in the memory, the automatic calibration and self-configuration module being defined by one or more task requirements; wherein the automatic and self-configuration module adjusts one or more camera settings to capture the one or more environmental images and one or more product images;

a dynamic onboarding module installed in the memory storing product information received from the one or more sensors;

a vision-based artificial intelligence module installed in the memory configured to perform tasks including product counting, material handling, quality control inspection;

and wherein the processor is configured to provide instructions to the robotic hand to execute tasks including pick- and place, quality inspection, counting and sorting.

11. The robotic workstation system of claim 10, comprising:

a display presenting an interactive touchscreen user interface configured to provide controls for the robotic hand, settings for the workstation and workstation performance settings.

12. The robotic workstation system of claim 11, wherein the camera includes a plurality of cameras positioned around the configurable workstation, at least one of the cameras including a product tracking module and wherein the display presents a comprehensive field of view derived from the plurality of cameras positioned around the configurable workstation.

13. The robotic workstation of claim 12, comprising:

a safety monitoring module receiving the input sensory data, the one or more environmental images and the product images, the safety monitoring module establishing a safety baseline including a collision detection threshold, a force limiting threshold and an emergency stop threshold.

14. The robotic workstation of claim 10, comprising:

one or more adjustable legs providing ergonomic support to the configurable workstation.

15. The robotic workstation of claim 10, comprising:

an artificial intelligence training module configured to train the configurable workstation, the module including a training interface, a data connection and processing platform, a machine learning model selector, a training module and a deployment module.

16. The robotic workstation of claim 10, comprising:

a QR code generator integrated into the configurable workstation.

17. The robotic workstation of claim 10, wherein the configurable workstation transmits real-time notifications of from a product classifier engine.

18. The robotic workstation of claim 10, comprising:

an inventory management module configured to receive information from the configurable workstation regarding one or more incoming products and one or more processed products, the inventory management module further configured to provide instructions to the robotic hand select and stack the processed products according to predefined settings.

\* \* \* \* \*